United States Patent [19]

Winckler

[11] Patent Number: 4,848,776
[45] Date of Patent: Jul. 18, 1989

[54] EXCLUSION SEAL ASSEMBLY

[75] Inventor: Peter S. Winckler, Birmingham, Mich.

[73] Assignee: Eaton Corporation, Cleveland, Ohio

[21] Appl. No.: 42,776

[22] Filed: Apr. 27, 1987

[51] Int. Cl.$^4$ .................. F16C 33/76; F16J 15/32; F16J 15/34; F16J 15/54
[52] U.S. Cl. .................. 277/23; 277/25; 277/58; 277/65; 277/95; 277/133; 277/135; 277/153; 384/478; 384/482; 384/486
[58] Field of Search ............. 277/23, 25, 35, 37, 277/38–41, 47, 52, 67, 69, 65, 58, 95, 96.1, 135, 133, 153, 24; 384/482, 140, 484, 486, 478, 472, 473

[56] References Cited

U.S. PATENT DOCUMENTS

| | | | |
|---|---|---|---|
| 1,849,404 | 3/1932 | Leonard, Jr. | 277/51 |
| 2,195,496 | 4/1940 | Reed | 277/135 X |
| 2,240,252 | 4/1941 | Bernstein | 277/39 |
| 2,418,707 | 4/1947 | Groot . | |
| 2,478,649 | 8/1949 | Wightman . | |
| 2,936,715 | 5/1960 | Southam et al. . | |
| 3,016,251 | 1/1962 | Gilbert . | |
| 3,021,161 | 2/1962 | Rhodes et al. | 277/37 |
| 3,028,181 | 4/1962 | Thompson et al. . | |
| 3,038,733 | 6/1962 | Hudson et al. . | |
| 3,087,733 | 4/1963 | Wheelock | 277/39 |
| 3,120,959 | 2/1964 | Jensen et al. | 277/37 |
| 3,266,811 | 8/1966 | Knauth . | |
| 3,504,917 | 4/1970 | Malmstrom | 277/25 |
| 3,536,332 | 10/1970 | Pitner . | |
| 3,640,540 | 2/1972 | Larsson . | |
| 3,681,142 | 8/1972 | Schmitt | 277/153 X |
| 3,703,296 | 11/1972 | Malmstrom . | |
| 4,000,930 | 1/1977 | Poncet | 277/135 X |
| 4,049,281 | 9/1977 | Bainard | 277/38 X |
| 4,428,586 | 1/1984 | Romero | 277/38 X |
| 4,491,332 | 1/1985 | Zambusch . | |
| 4,550,920 | 11/1985 | Matsushima | 277/153 X |

Primary Examiner—Allan N. Shoap
Attorney, Agent, or Firm—P. S. Rulon

[57] ABSTRACT

A seal assembly (22 or 50) including a primary seal (26), an exclusion seal (28 or 52), and a contaminant absorbing material (30 or 54). The exclusion seal and absorbing material extend the life of the primary seal. The exclusion seal is of the face seal type and includes spacer means (40, 42, 38 or 62, 64, 56) for proper positioning of a sealing lip (34d or 60a) of an elastomeric seal member (34 or 60) relative to an axial facing sealing surface (36a or 58c). The absorbing material (30 or 54) is disposed between the exclusion seal and the primary seal for absorbing contaminants which get by the exclusion seal. The axially facing sealing surface (36a or 58c) may be defined by a frustonconical surface such as provided by a spring washer (44). The seal assembly (50) includes circumferentially, radially spaced vanes (62d) for centrifuging contaminants radially outward and into the absorbing material.

28 Claims, 1 Drawing Sheet

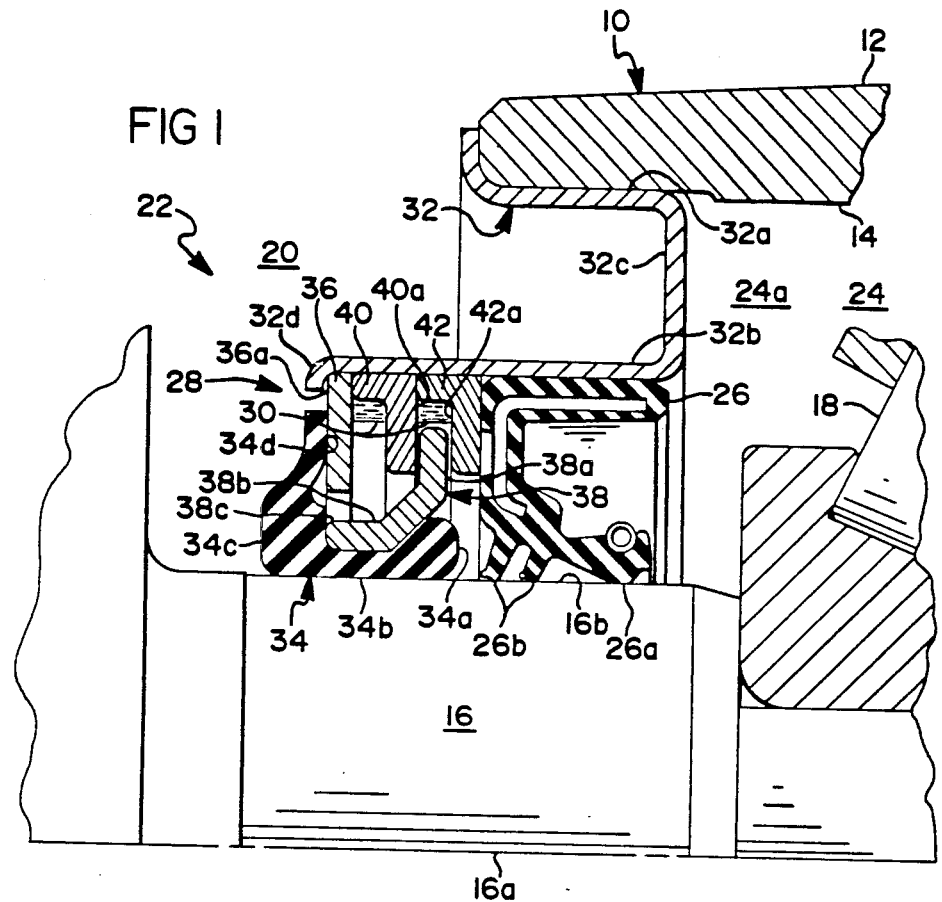

EXCLUSION SEAL ASSEMBLY

FIELD OF THE INVENTION

This invention relates to a shaft seal assembly and in particular to an exclusion seal assembly for preventing ingress of foreign matter such as grit, water, etc. into a housing or onto the sealing lip(s) of a seal for preventing egress of the fluid from the housing.

BACKGROUND OF THE INVENTION

Exclusion seals, which are sometimes referred to as dust seals, are well known in the prior art. Various forms of such seals are shown in U.S. Pat. Nos. 4,491,332; 3,703,296; 3,640,540; and 3,504,917. Exclusion seals are often used in off-road vehicles to reduce the deleterious effects of foreign matter (e.g., grit from mud and dust) on the sealing lips of seals for preventing egress of oil or grease from vehicle components such as transmission and axle housings.

SUMMARY OF THE INVENTION

An object of the present invention is to provide an exclusion seal assembly which is readily installed without special attention to location of the assembly's seal lip.

Another object of the present invention is to provide an exclusion seal assembly which prolongs the life of a primary seal assembly.

Another object of this invention is to control lip loading as a function of speed of the shaft carrying the seal.

According to a feature of the invention, an annular seal assembly is provided for sealing an annular space between an outer cylindrical surface of a shaft extending through an opening in a housing, the shaft being mounted for rotation about its axis and relative to the housing; the seal assembly comprising an elastomeric member having an inner cylindrical surface and a radially outwardly extending flange portion defining an axially facing sealing lip, the inner cylindrical surface adapted for static sealing relation with the outer cylindrical surface of the shaft and rotation therewith; a fastening device engaging a portion of the elastomeric member and rotatable therewith for preventing loss of the static sealing relation due to rotation of the elastomeric member by the shaft; the assembly characterized by an annular support member adapted to be fixed to the housing in static sealing relation with the opening, the support member including a cylindrical portion; a sealing flange extending radially from and in the static sealing relation with the cylindrical portion of the support member, the flange defining a substantially axially facing surface in dynamic sealing relation with the sealing lip of the elastomeric member; and spacer means disposed in the cylindrical portion of the support member and receiving a radially outer portion of the fastening device for axially positioning the sealing lip of the elastomeric member relative to the axial facing surface of the sealing flange.

According to another feature of the invention, the seal assembly includes an exclusion seal disposed between ambient and a primary seal preventing egress of fluid from the housing, and the seal assembly further including means disposed between the exclusion and primary seals for absorbing contaminant matter which gets by the exclusion seal.

According to another feature of the invention, an annular seal assembly is provided for sealing an annular space between an outer cylindrical surface of a shaft extending through an opening in a housing, the shaft mounted for rotation about its axis and relative to the housing. The seal assembly includes a primary seal for preventing egress of fluid from the housing; an exclusion seal axially spaced from the primary seal for shielding the primary seal from ambient contaminants; and an improvement characterized by an absorbent material disposed between the seals for absorbing contaminants which may get by the exclusion seal.

DESCRIPTION OF THE DRAWINGS

The seal assembly of the present invention is shown in the accompanying drawing in which:

FIG. 1 is a sectional view of the seal assembly disposed in a partially shown housing assembly;

FIG. 2 is a sectional view of an alternative embodiment of the seal assembly; and FIG. 3 is a sectional view of a modified part for the seal assemblies in FIGS. 1 and 2.

DETAILED DESCRIPTION OF THE DRAWINGS

A partially shown housing assembly 10 in FIG. 1 includes a housing portion 12 defining an opening 14 through which extends a shaft 16 mounted for rotation about its axis 16a by a partially shown roller bearing 18 supported by the housing the known manner. The housing may be for an axle or transmission which is exposed on its ambient or exterior 20 to contaminant matter such as mud or dust. A seal assembly 22, disposed in an annular space 24a defined by opening 14 and shaft 16, is provided to respectively prevent egress and ingress of fluid and contaminant matter from and to the interior 24 of the housing.

The seal assembly 22 includes a primary seal 26, an exclusion seal 28 of the face type, and an absorbing means or material 30 disposed between the seals. The seals and absorbing means are supported at their radially outer extent by a support member 32 including an outer cylindrical portion 32a pressed into opening 14 so as to form a static seal therewith, an inner cylindrical portion 32b, and a radially extended portion 32c interconnecting the cylindrical portions. Primary seal is retained against rotation relative to the housing by being press fitted into inner cylindrical portion 32b of support member 32. The press fit forms a static seal and positions a main seal lip 26a of the primary seal in concentric, dynamic sealing relation with an outer cyindrical surface 16b of shaft 16. Seal 26 may also, in a known manner, include single or double exclusion or dust lips 26b. Main sealing lip 26a, which prevents egress or leakage of fluid from housing assembly 10, is subject to premature failure due to rapid wear when exposed to contaminants, particularly abrasive, gritty contaminants such as mud, sand, or dust. Exclusion lips 26b have been found to only delay such failure for relatively short periods of time in installations exposed to high levels of contaminants such as encountered by off-road vehicles.

The life of primary seals is known to be improved somewhat by use of axially facing exclusion seals, i.e., a seal having a sealing lip or lips which run against an axially facing surface. The surface is usually defined by a portion of the structure to be sealed, e.g., the housing through which a shaft extends. Effectiveness of such a seal depends greatly on proper positioning of the sealing lip or lips relative to the surface. Hence, the seal must either be carefully positioned on the shaft during seal installation or be self-positioning during use. Careful positioning during installation requires a special gauging operation, increases assembly costs, and increases the the probability of improper installation, particularly during repair and overhaul. Self-positioning entails or requires meticulous control of seal and shaft tolerance. Such tolerance control increases manufacturing costs. Further, the tolerances may be adversely effected by conditions beyond the seal manufactures control and therefore result in improper self-positioning. Such disadvantages are negated by exclusion seal 28 wherein the seal and axially facing surfaces are combined into a self-contained, preassembled unit which does not require special gauging during installation or meticulous control of tolerance beyond the seal manufacturers control.

Exclusion seal 28 includes an elastomeric seal member 34, a radially extended seal flange 36, a fastening device 38, and a spacer assembly defined by annular members or flanges 40, 42 of L-shaped cross-section and a radially outwardly extending flange of 38a of fastening device 38. Elastomeric seal member 34 includes an annular portion 34a having an inner cylindrical surface 34b forming a static seal with outer cylindrical surface 16b of shaft 16 and a radially outwardly extending flange portion 34c defining an axially facing sealing lip 34d. Sealing lip 34d forms a dynamic seal with an axially facing sealing surface 36a of sealing flange 36. Sealing flange 36 also forms a static seal at its interface with a rolled end 32d of inner cylindrical portion 32b of the support member. This static seal may be supplemented by known sealing substances or absorbate material 30. Sealing flange 36 and annular members 40, 42 of the spacer means are securely sandwiched between rolled end 32d and primary seal 26. Alternatively, sealing flange 36 may be integrally formed with the support member in a manner substantially as shown in FIG. 2 and/or may have a frustoconical sealing surface 44a as is readily provided by a spring washer 44 shown in cross-section in FIG. 3. Fastening device 38, in addition to flange 38a of the spacer means, include a ring portion 38b banded about annular portion 34a of the elastomeric seal member for preventing loss of the static seal between surfaces 16d and 34b due to swelling or centrifugal forces stretching the elastomeric seal member. Axially facing surfaces 40a, 42a of annular member 40, 42 embrace flange 38a of the fastening device for accurately positioning sealing lip 34d against sealing face 36a with a predetermined preload.

Further, the radially inner portion of flange 34c of the elastomeric seal member may be provided with a predetermined geometry and mass based on elasticity and speed of the seal member for counteracting a tendency of lip 34d to move axially away from sealing surface 36a due to centrifugal forces. Such tendency is counteracted by an end 38c of ring 38b which is adjacent or axially abuts the flange 34c and provides a pivot for directing or allowing flange 34c to move axially rightward in FIG. 1 to control lip loading as a function of speed.

Contaminants, which invariably get by sealing lip 34d of the exclusion seal, are absorbed or accumulated by the absorbent material 30. The absorbent material may be grease, cellular materials, etc. Examples of cellular materials are urethane foam, or fibers such as wool, metal wool or felt, etc. Numeral 30 designates a grease disposed in the annular spaces defined by annular members 40, 42 and flange 36. Preferably, the spaces are partially filled with grease and the grease consistency is chosen to provide maximum penetration of contaminants. The absorbent material may also be located in the space between member 40 and sealing flange 36. The use of such absorbent materials between exclusion seal 38 and primary seal 26 has greatly increased the useful life of the primary seal.

FIG. 2 illustrates a seal assembly 50 including an exclusion seal 52 and absorbent material 54. Seal assembly 50 embodies the features of FIG. 1 but adapted to be piggybacked on a support member 56 of an unshown primary seal. Assembly 50 additionally includes the feature of centrifuging contaminants radially outward and into absorbent material 54 to further prevent migration of contaminants to the primary seal. Assembly 50 includes a sheet metal member 58 having a cylindrical portion 58a telescopically pressed over a cylindrical portion 56a of support member 56 and a radially extending flange 58b defining a sealing surface 58c analogous to surface 36a, an elastomeric seal member 60 substantially the same as seal member 34, a combination fastening-spacer-centrifuge assembly defined by a member 62 and positioned between flanges 56b, 58b, and the absorbent material 54 in the form of a felt. An inner circumferential surface 62a and axially facing ends 62b, 62c of member 62 radially restrains and axially positions seal member 60. The preload on a lip 60a of seal member 60 may be varied by varying the thickness of an annular shim or flange 64 in cooperation with, the telescoping press fit of cylindrical portion 58a on support member 56. End 62c of member 62 defines a plurality of circumferentially spaced, radially extending vanes 62d which centrifuge contaminants radially outward for absorption by felt material 54.

While preferred embodiments of the present invention have been illustrated and described in detail, it will be apparent that various changes and modifications may be made to the disclosed embodiments without departing from the scope and spirit of the invention. The appended claims are intended to cover the disclosed embodiments and all changes and modifications believed to be within the spirit of the invention.

What is claimed is:

1. An annular seal assembly for sealing an annular space between an outer cylindrical surface of a shaft extending through an opening in a housing, the shaft mounted for rotation about its axis and relative to the housing; the seal assembly comprising:

an elastomeric member having an inner cylindrical surface and a radially outwardly extending flange portion defining an axially facing sealing lip, the inner cylindrical surface adapted for static sealing relation with the outer cylindrical surface of the shaft and rotation therewith;

a fastening device engaging a portion of the elastomeric member and rotatable therewith for preventing loss of the static sealing relation due to rotation of the elastomeric member by the shaft;

an annular support means adapted to be fixed to the housing in static sealing relation with the opening, the support means including a cylindrical portion;

a spring washer defining a sealing flange extending radially from and in static sealing relation with the cylindrical portion of the support means, the flange defining a substantially axially facing and radially outwardly facing frustoconical surface in dynamic sealing relation with the sealing lip of the elastomeric member; and spacer means disposed in the cylindrical portion of the support means and receiving a radially outer portion of the fastening device for axially positioning the sealing lip of the elastomeric member relative to the axially facing surface of the sealing flange.

2. An annular seal assembly for sealing an annular space between an outer cylindrical surface of a shaft extending through an opening in a housing, the shaft mounted for rotation about its axis and relative to the housing; the seal assembly comprising:

an elastomeric member having an inner cylindrical surface and a radially outwardly extending flange portion defining an axially facing sealing lip, the inner cylindrical surface adapted for static sealing relation with the outer cylindrical surface of the shaft and rotation therewith;

a fastening device engaging a portion of the elastomeric member and rotatable therewith for preventing loss of the static sealing relation due to rotation of the elastomeric member by the shaft;

an annular support means adapted to be fixed to the housing in static sealing relation with the opening, the support member including a cylindrical portion;

a sealing flange extending radially from and in static sealing relation with the cylindrical portion of the support means, the flange defining a substantially axially facing surface facing away from the cylindrical portion and in dynamic sealing relation with the sealing lip of the elastomeric member;

spacer means disposed in the cylindrical portion of the support means and receiving a radially outer portion of the fastening device for axially positioning the sealing lip of the elastomeric member relative to the axially facing surface of the sealing flange; and the cylindrical portion of the support means supporting a radial lip seal forming a dynamic seal with the outer cylindrical surface of the shaft and axially spaced from the sealing flange by the spacer means.

3. The seal assembly of claim 2, wherein the spacer means includes first and second axially spaced apart annular flanges extending radially inward from the cylindrical portion of the support means and embracing the radially outer portion of the fastening device.

4. The seal assembly of claim 3, wherein the first and second axially spaced apart flanges define an annular space containing an absorbent material for absorbing contaminant matter.

5. The seal assembly of claim 4 wherein the fastening device includes means for centrifuging the contaminant matter radially outward into the absorbent material.

6. The seal assembly of claim 4, wherein absorbent material is a felt material.

7. The seal assembly of claim 4, wherein the absorbent material is a grease-like material.

8. The seal assembly of claim 4, wherein the inner surface of the elastomeric member is defined by a cylindrical portion having the flange portion extending therefrom; wherein the fastening device includes a ring portion banded about the outer diameter of the cylindrical portion, the ring portion having an axially facing end adjacent a radially inward portion of the flange portion; and wherein increasing centrifugal forces acting on the flange portion in response to increasing shaft speed causes the flange portion to pivot about the end of the ring portion to control pressure loading of the sealing lip relative the axially facing surface of the flange portion.

9. The seal assembly of claim 2, wherein the pivotal movement increases the pressure loading of the sealing lip.

10. The seal assembly of claim 2, wherein the flange portion is provided with a predetermined mass for controlling the amount of the pivotal movement.

11. The seal assembly of claim 2, wherein the spacer means includes first and second axially spaced apart annular flanges extending radially inward from the cylindrical portion of the support means and embracing the radially outer portion of the fastening device.

12. The seal assembly of claim 11, wherein the first and second axially spaced apart flanges define an annular space containing an absorbent material for absorbing contaminant matter.

13. The seal assembly of claim 12 wherein the fastening device includes means for centrifuging the contaminant matter radially outward into the absorbent material.

14. The seal assembly of claim 13, wherein the sealing flange is integrally formed with one end of the cylindrical portion of the support means.

15. The seal assembly of claim 12, wherein absorbent material is a felt material.

16. The seal assembly of claim 12, wherein the absorbent material is a grease-like material.

17. An annular seal assembly for sealing an annular space between an outer cylindrical surface of a shaft extending through an opening in a housing, the shaft mounted for rotation about its axis and relative to the housing; the seal assembly comprising:

an elastomeric member having an inner cylindrical surface and a radially outwardly extending flange portion defining an axially facing sealing lip, the inner cylindrical surface adapted for static sealing relation with the outer cylindrical surface of the shaft and rotation therewith;

a fastening device engaging a portion of the elastomeric member and rotatable therewith for preventing loss of the static sealing relation due to rotation of the elastomeric member by the shaft;

an annular support means adapted to be fixed to the housing in static sealing relation with the opening, the support member including a cylindrical portion;

a sealing flange extending radially from and in static sealing relation with the cylindrical portion of the support means, the flange defining a substantially axially facing surface in dynamic sealing relation with the sealing lip of the elastomeric member; and spacer means disposed in the cylindrical portion of the support means and including first and second axially spaced apart annular flanges extending radially inward from the cylindrical portion of the support means and embracing a radially outer portion of the fastening device for axially positioning the sealing lip of the elastomeric member relative to the axially facing surface of the sealing flange.

18. The seal assembly of claim 17, wherein the sealing flange is integrally formed with one end of the cylindrical portion of the support means.

19. The seal assembly of claim 17, wherein the inner surface of the elastomeric member is defined by a cylindrical portion having the flange portion extending therefrom; wherein the fastening device includes a ring portion banded about the outer diameter of the cylindrical portion, the ring portion having an axially facing end adjacent a radially inward portion of the flange portion; and wherein increasing centrifugal forces acting on the flange portion in response to increasing shaft speed causes the flange portion to pivot about the end of the ring portion to control pressure loading of the sealing lip relative the axially facing surface of the flange portion.

20. The seal assembly of claim 19, wherein the pivotal movement increases the pressure loading of the sealing lip.

21. The seal assembly of claim 20, wherein the flange portion is provided with a predetermined mass for controlling the amount of the pivotal movement.

22. An annular seal assembly for sealing an annular space between an outer cylindrical surface of a shaft extending through an opening in a housing with a portion the shaft being disposed in the interior of the housing and an axially spaced portion thereof disposed exterior of the housing, the shaft mounted for rotation about its axis and relative to the housing; the seal assembly comprising an exclusion seal disposed between the exterior and a primary seal preventing egress of fluid from the housing; the exclusion seal including:

an elastomeric member having an inner cylindrical surface and a radially outwardly extending flange portion defining an axially facing sealing lip, the inner cylindrical surface adapted for static sealing relation with the outer cylindrical surface of the shaft and rotation therewith;

a fastening device engaging a portion of the elastomeric member and rotatable therewith for preventing loss of the static sealing relation due to rotation of the elastomeric member by the shaft;

an annular support means adapted to be fixed to the housing in static sealing relation with the opening, the support member including a cylindrical portion;

a sealing flange extending radially from and in static sealing relation with the cylindrical portion of the support means, the flange defining a substantially axially facing surface in dynamic sealing relation with the sealing lip of the elastomeric member;

spacer means disposed in the cylindrical portion of the support means and receiving a radially outer portion of the fastening device for axially positioning the sealing lip of the elastomeric member relative to the axially facing surface of the sealing flange; and means disposed between the exclusion and primary seals for absorbing contaminant matter which gets by the exclusion seal.

23. The seal assembly of claim 22, wherein the spacer means includes first and second axially spaced apart annular flanges extending radially inward from the cylindrical portion of the support means and embracing the radially outer portion of the fastening device.

24. The seal assembly of claim 22, wherein absorbent material is a felt material.

25. The seal assembly of claim 22, wherein the absorbent material is a grease-like material.

26. The seal assembly of claim 22, wherein the absorbent material is disposed in an annular space axially disposed between the exclusion and primary seals and radially disposed between the outer cylindrical surface of the shaft and the cylindrical portion of the annular support means, and said absorbent material is a grease-like material partially filling the annular space.

27. The seal assembly of claim 26, wherein the spacer means includes first and second axially spaced apart annular flanges extending radially inward from the cylindrical portion of the support means and embracing the radially outer portion of the fastening device.

28. An annular seal assembly for sealing an annular space between an outer cylindrical surface of a shaft extending through an opening in a housing, the shaft mounted for rotation about its axis and relative to the housing; the seal assembly including:

a primary seal for preventing egress of fluid from the housing;

an exclusion seal axially spaced from the primary seal for shielding the primary seal from ambient contaminants;

an absorbent material disposed between the seals for absorbing contaminants which may get by the exclusion seal; and means disposed between the seals for centrifuging the contaminants radially outward and into the absorbent material.

* * * * *